US010767799B2

(12) United States Patent
Hudson et al.

(10) Patent No.: US 10,767,799 B2
(45) Date of Patent: Sep. 8, 2020

(54) VAPOR COUPLER

(71) Applicant: OPW-Engineered Systems, Inc., Lebanon, OH (US)

(72) Inventors: Stephen Hudson, New South Wales (AU); Shiang Taing, Chester Hill (AU); David Morrow, Cincinnati, OH (US)

(73) Assignee: OPW-ENGINEERED SYSTEMS, INC., Lebanon, OH (US)

( * ) Notice: Subject to any disclaimer, the term of this patent is extended or adjusted under 35 U.S.C. 154(b) by 353 days.

(21) Appl. No.: 15/866,918

(22) Filed: Jan. 10, 2018

(65) Prior Publication Data
US 2018/0202593 A1 Jul. 19, 2018

Related U.S. Application Data

(60) Provisional application No. 62/447,423, filed on Jan. 17, 2017.

(51) Int. Cl.
*F16L 37/18* (2006.01)
*F16L 37/05* (2006.01)
*F16L 37/44* (2006.01)
*B01L 3/00* (2006.01)

(52) U.S. Cl.
CPC .............. *F16L 37/18* (2013.01); *F16L 37/05* (2013.01); *F16L 37/44* (2013.01); *B01L 3/563* (2013.01)

(58) Field of Classification Search
CPC ... F16L 37/05; F16L 37/0847; F16L 37/0848; F16L 37/12; F16L 37/121; F16L 37/127; F16L 37/18; F16L 37/44; F16L 37/38; F16L 37/40

USPC .................................................. 285/311, 312
See application file for complete search history.

(56) References Cited

U.S. PATENT DOCUMENTS

| | | | | |
|---|---|---|---|---|
| 2,896,971 | A * | 7/1959 | Kolar | F16L 37/088 251/149.7 |
| 4,030,524 | A * | 6/1977 | McMath | F16L 37/127 137/614.06 |
| 4,135,551 | A * | 1/1979 | Knight | F16L 37/127 137/614.06 |
| 4,234,161 | A * | 11/1980 | Wilder | F16L 37/1205 137/614.06 |
| 5,535,984 | A * | 7/1996 | Anderson | F16L 37/20 251/149.9 |
| 6,009,901 | A * | 1/2000 | Roberts | F16L 37/36 137/614.01 |
| 10,386,017 | B2 * | 8/2019 | Thomas | F17C 5/02 |

(Continued)

*Primary Examiner* — Aaron M Dunwoody
(74) *Attorney, Agent, or Firm* — Workman Nydegger

(57) ABSTRACT

A fluid system coupler includes a coupler body having an open end for receiving an adaptor therein. A seal assembly is movably disposed within the coupler body for selective sealing engagement with an adaptor. Lever cams pivot into or out of slots in the coupler body between locked and unlocked positions to fasten or unfasten the adaptor to the coupler. A handle is movably connected to the coupler body. Movement of the handle moves the seal assembly within the coupler body. Movement of the handle also results in movement of the lever cams between the locked and unlocked positions. A poppet assembly is mounted to the seal assembly. The poppet assembly can selectively open or close a fluid passageway through the coupler.

23 Claims, 10 Drawing Sheets

(56) References Cited

U.S. PATENT DOCUMENTS

2015/0377397 A1* 12/2015 Acquistapace ....... F16L 37/101
                                                                    285/93
2016/0312939 A1* 10/2016 Konishi ................. F16L 55/07
2017/0334640 A1* 11/2017 Roth .................... F16K 31/602
2019/0077652 A1*  3/2019 Bailey .................... B67D 7/54

* cited by examiner

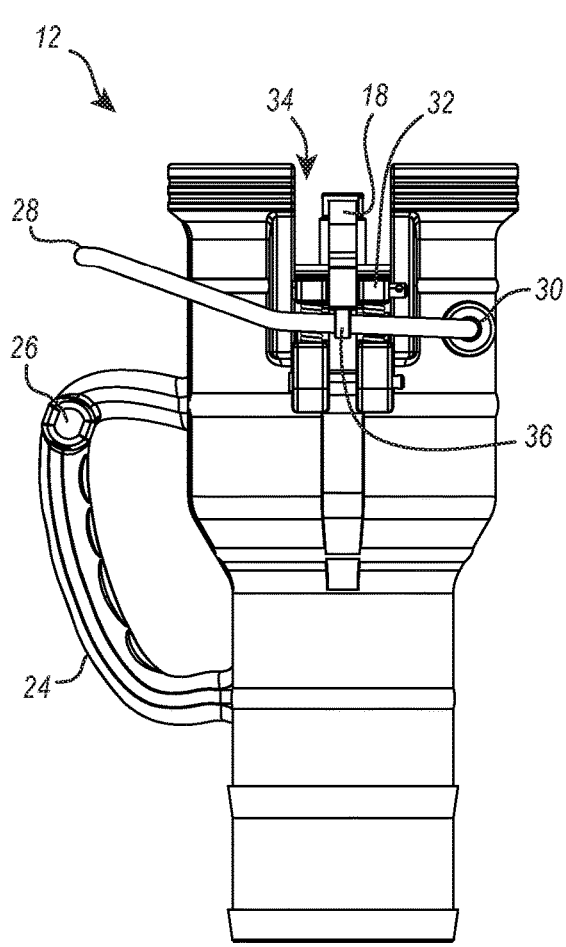
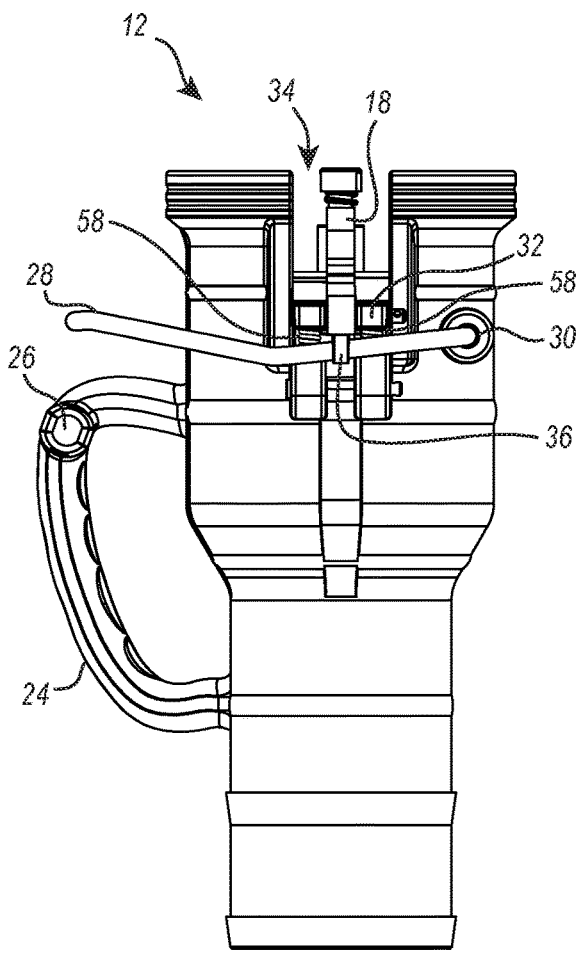
FIG. 4A
FIG. 4B

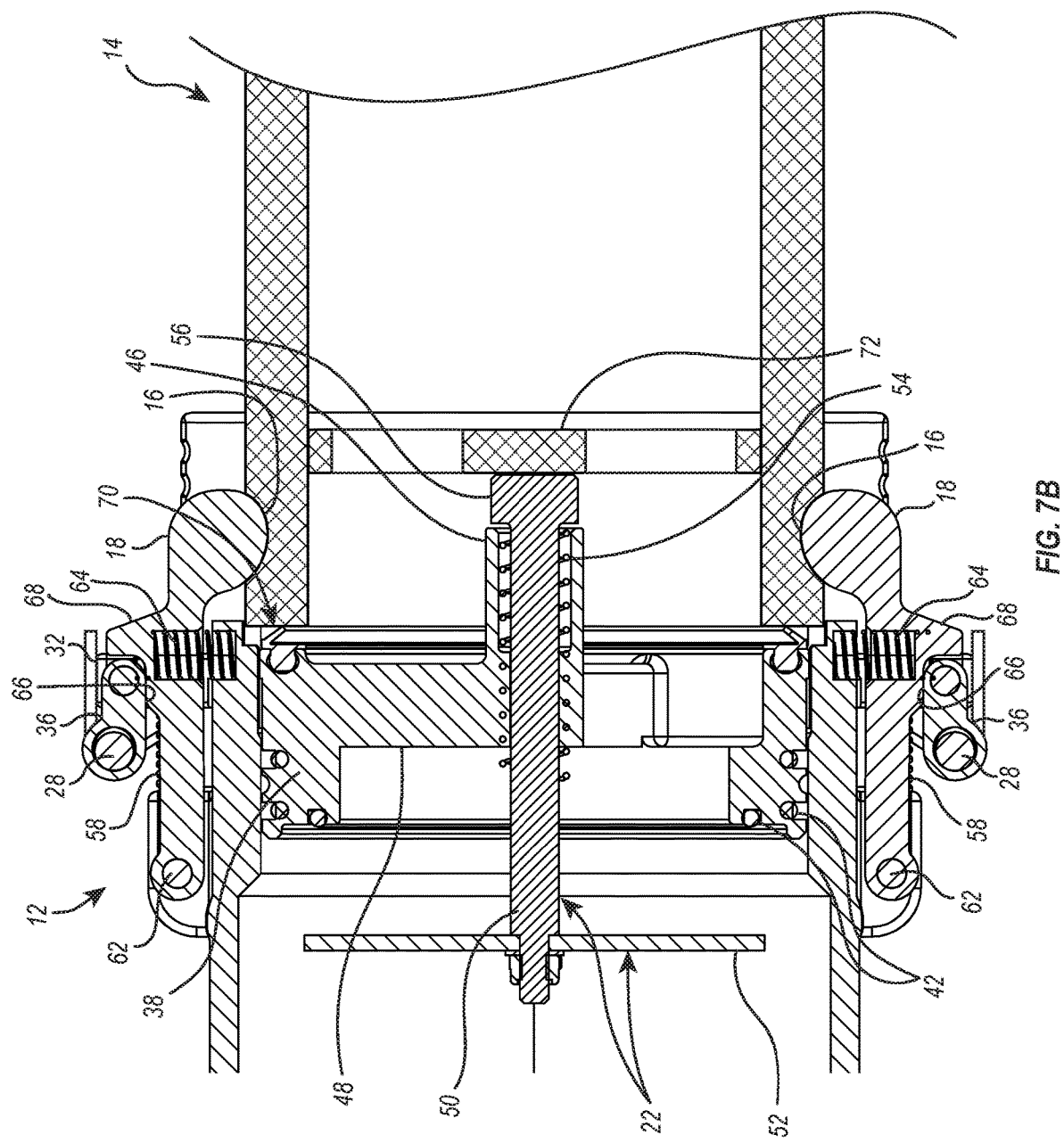

VAPOR COUPLER

This application claims priority to and the benefit of U.S. Provisional Application No. 62/447,423, filed Jan. 17, 2017, and entitled VAPOR COUPLER, the entire content of which is incorporated herein by reference.

BACKGROUND

1. Technical Field

Exemplary embodiments of the present disclosure relate to fluid system components. More particularly, exemplary embodiments of the present disclosure relate to vapor coupler devices for use in fluid systems.

2. The Relevant Technology

In recent years, environmental concerns have been receiving significantly more attention, and various governmental agencies have responded by implementing stringent regulations to reduce or prevent pollution. Many of these regulations and concerns are directed towards those industries that transport fluids. For example, it is very difficult to transport a fluid without spilling or leaking some of the fluid (or vapor when in gaseous form) into the environment. Thus, some environmental regulations require that minimal leaking occur during handling, processing, or transportation of the fluid.

These environmental concerns become especially clear when considering the magnitude of the industries that handle fluids that can cause significant damage in small quantities. There is a concern, therefore, to protect both the public and the environment from these types of fluids and vapors. While some fluids that are transported, such as water and milk, may not pollute the environment when they are leaked or spilled, the loss of fluid into the environment is nevertheless viewed as a general waste of resources. More generally, the loss of fluid into the environment is not desirable even if the fluid does not contribute to pollution.

Within the transportation industry, a variety of different devices are used to transport a fluid from a source to a destination. These devices often use couplings, valve assemblies, and conduits of various types to both connect the source to the destination as well as to manage fluid and/or vapor flow through the conduit. With each transfer of fluid, there is a risk that leakage will occur due to human error, equipment malfunctions, or the like. As previously stated, it is desirous and often critical to ensure that the spills or leaks are substantially minimized.

A common source of fluid or vapor leaks are the connections between various components of the fluid systems. For example, when a fuel transport vehicle is delivering liquid through a conduit such as a hose into a fuel tank, the hose is attached to the vehicle at one end and to a fuel tank at the other end. The hose may be attached to the fuel tank via a coupler and an adaptor, each of which includes a valve. Even when the coupler and adaptor are connected and disconnected properly, and their associated valves function properly, current couplers, adaptors, and their associated valves often still allow for fluids or vapors to leak, spill, or otherwise be exposed to the environment.

Accordingly, what is desired are coupling devices that minimize the amount of fluid or vapor that is able to escape therefrom or otherwise be exposed to the environment.

BRIEF SUMMARY

Exemplary embodiments of the present disclosure relate to coupling devices that limit the amount of fluid or vapor that is able to escape therefrom or is otherwise exposed to the environment. For example, in one embodiment, a fluid system coupler includes a coupler body at least partially defining a fluid passageway therethrough. The coupler body has an open end configured to selectively receive an adaptor therein. A seal assembly is movably disposed within the coupler body. One or more lever cams are pivotally connected to the coupler body. A handle is movably connected to the coupler body and is operatively associated with the seal assembly and the one or more lever cams such that movement of the handle moves the seal assembly and enables the one or more lever cams pivot relative to the coupler body.

In another embodiment, a fluid system coupler includes a coupler body having an open end for receiving an adaptor therein. A seal assembly is movably disposed within the coupler body for selective sealing engagement with the adaptor. Lever cams pivot into or out of slots in the coupler body between locked and unlocked positions to fasten or unfasten the adaptor to the coupler. A handle is movably connected to the coupler body. Movement of the handle moves the seal assembly within the coupler body into or out of engagement with the adaptor. Movement of the handle also results in movement of the lever cams between the locked and unlocked positions. Additionally, a poppet assembly is mounted to the seal assembly. The poppet assembly can selectively open or close a fluid passageway through the coupler.

In one embodiment, a fluid system coupler includes a coupler body at least partially defining a fluid passageway therethrough. The coupler body has an open end configured to selectively receive an adaptor therein. One or more slots extend through the coupler body adjacent to the open end. A seal assembly is disposed within the coupler body and is movable between a first position and a second position to engage or disengage the adaptor. The seal assembly has one or more central openings to allow fluid or vapor to flow through the seal assembly. The seal assembly includes one or more seals that interface with an inner surface of the coupler body to prevent the flow of fluid or vapor between the seal assembly and the coupler body. The seal assembly also has one or more wings that extend through the one or more slots in the coupler body. Further, the seal assembly includes a guide.

One or more lever cams are pivotally connected to the coupler body. The one or more lever cams are movable between a locked position and an unlocked position. A portion of the one or more lever cams extends through the one or more slots in the coupler body to engage the adaptor when the one or more lever cams are in the locked position. In contrast, the one or more lever cams are at least partially withdrawn from the one or more slots to disengage the adaptor when the one or more lever cams are in the unlocked position.

A handle is movable connected to the coupler body. The handle is movable between a first position and a second position. Movement of the handle from the first position to the second position moves the seal assembly from the first position to the second position to disengage the adaptor and enables the one or more lever cams to move to the unlocked position to disengage the adaptor. In contrast, movement of the handle from the second position to the first position moves the seal assembly from the second position to the first position and moves the one or more lever cams to locked position.

A poppet assembly is movably mounted to the guide of the seal assembly. The poppet assembly comprises a shaft slidably disposed at least partially within the guide and a seal plate connected to the shaft. The poppet assembly is movable between an open configuration and a closed configuration. The seal plate closes off the one or more central openings in the seal assembly when the poppet assembly is in the closed configuration. In contrast, the seal plate is spaced apart from the seal assembly to enable fluid or vapor to flow through the one or more central openings when the poppet assembly is in the open configuration.

In still another embodiment, a fluid system coupler includes a coupler body at least partially defining a fluid passageway therethrough and having an open end configured to selectively receive an adaptor therein. A seal assembly is movably disposed within the coupler body. A poppet assembly is movably mounted to the seal assembly and includes a seal plate that is movable between an open configuration and a closed configuration. A handle is movably connected to the coupler body and is operatively associated with the seal assembly such that movement of the handle moves the seal assembly relative to the coupler body.

These and other objects and features of the present disclosure will become more fully apparent from the following description and appended claims, or may be learned by the practice of the disclosed embodiments as set forth hereinafter.

BRIEF DESCRIPTION OF THE DRAWINGS

To further clarify the above and other advantages and features of the present disclosure, a more particular description will be rendered by reference to specific embodiments thereof which are illustrated in the appended drawings. It is appreciated that these drawings depict only typical embodiments and are therefore not to be considered limiting of its scope, nor are the drawings necessarily drawn to scale. The disclosure will be described and explained with additional specificity and detail through the use of the accompanying drawings in which:

FIGS. 4A and 4B are side views of the coupler of FIG. 2.

FIGS. 7A and 7B are cross-sectional views of the coupling device of FIG. 1.

DETAILED DESCRIPTION

Reference will now be made to the drawings to describe various aspects of exemplary embodiments of the disclosure. It is understood that the drawings are diagrammatic and schematic representations of such exemplary embodiments, and are not limiting of the present disclosure. While the drawings are not necessarily drawn to scale, the drawings may be to scale for some embodiments. No inference should therefore be drawn from the drawings as to the dimensions of any embodiment or element, unless indicated otherwise. In the following description, numerous specific details are set forth in order to provide a thorough understanding of the present disclosure. It will be obvious, however, to one of ordinary skill in the art that the present disclosure may be practiced without these specific details.

While the various features of the present disclosure are hereinafter illustrated and described as being particularly adaptable to fluid systems handling potentially dangerous fluids and vapors, it is to be understood that various features of the present disclosure can be utilized singly or in any combination thereof to provide coupling devices for use with any fluid whether in a liquid or gaseous state.

Figure 1:
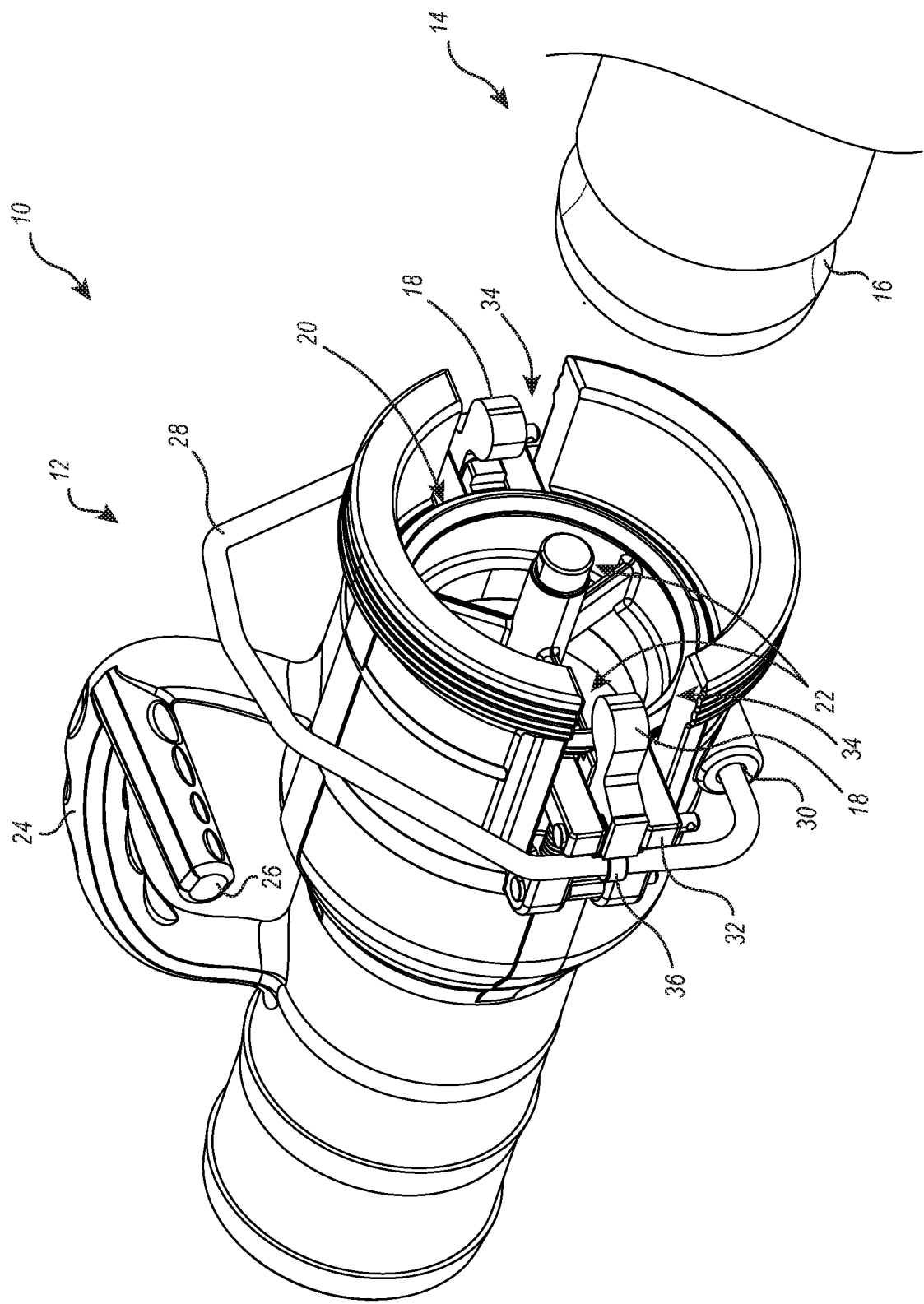
FIG. 1 is a perspective view of the coupling device according to one embodiment of the present disclosure showing the adaptor and coupler separated from one another.

Turning now to FIG. 1, there is illustrated an exemplary embodiment of a coupling device or coupling 10. Coupling 10 includes a coupler 12 and an adaptor 14 that are selectively securable together about a common axis by fastening features provided on such members. The coupler 12 and adaptor 14 can be readily fastened together irrespective of their angular positions about such axis. As discussed in greater detail below, the coupler 12 includes a seal assembly for sealing the connection with the adaptor 14. As also discussed below, the coupler 12 includes a poppet assembly for preventing the flow of fluid or vapor through the coupler 12 when the coupler 12 is disconnected from the adaptor 14. The adaptor 14 can also include a seal assembly and/or a poppet assembly to help seal the connection with the coupler 12 and/or for preventing the flow of fluid or vapor therethrough when the adaptor 14 is disconnected from the coupler 12. The poppet assemblies can thus provide a dry-break, such that a very limited amount of fluid or vapor, if any, escapes or is lost from the coupling device 10 when the coupler 12 and adaptor 14 are taken apart.

As illustrated in FIG. 1, the coupler 12 is a female member and the adaptor 14 is a male member. The coupler 12 includes an open end or bore configured to receive a terminal end portion of the adaptor 14 therein. Fastening features are provided on the coupler 12 and adaptor 14 for fastening and unfastening the coupler 12 and adaptor 14. Generally, the fastening features include an annular grove 16 and one or more lever cams 18. More specifically, the annular groove 16 is formed in an outer surface of the adaptor 14 near the terminal end that is received into the coupler 12. The lever cams 18 can pivot so that portions of the lever cams 18 are positioned within the groove 16 to fasten the coupler 12 and the adaptor 14 together. The lever cams 18 can also pivot away from the adaptor 14 so that the lever cams 18 are removed from the groove 16 to unfasten the coupler 12 and the adaptor 14 from one another.

Figure 2:
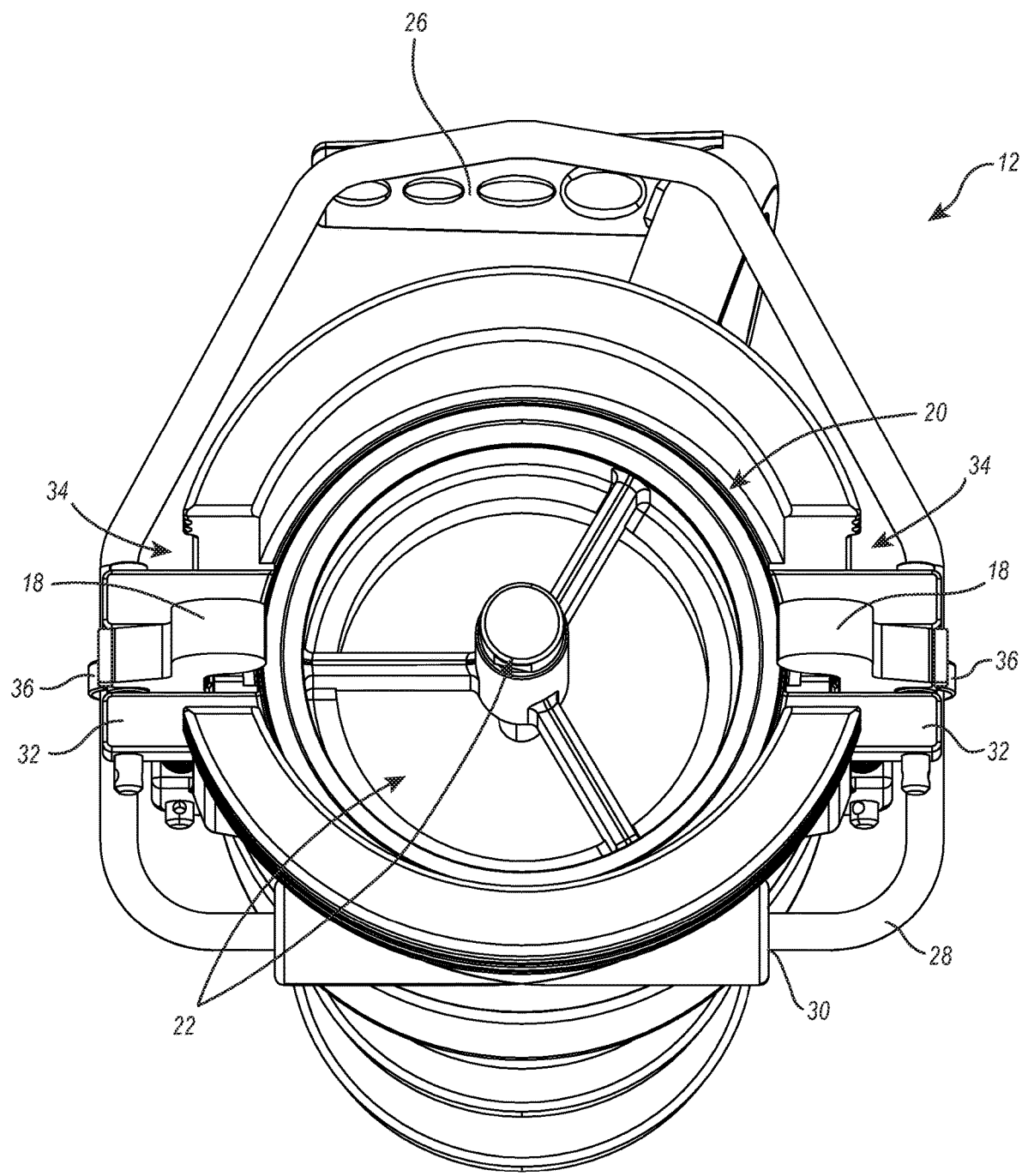
FIG. 2 is an end perspective view of the coupler of the coupling device of FIG. 1.

In the embodiment illustrated in FIGS. 1 and 2, the coupler 12 includes a seal assembly 20 and a poppet assembly 22. As will be discussed in greater detail below, the seal assembly 20 cooperates with the terminal end of the adaptor 14 to create a seal between the coupler 12 and the adaptor 14 to limit or prevent fluid and vapors from escaping the coupling 10. As will also be discussed in greater detail below, the poppet assembly 22 is configured to seal off the flow of fluid or vapors through the coupler 12 when the coupler 12 is disconnected from the adaptor 14.

As can also be seen in FIGS. 1 and 2, the coupler 12 also includes various handles 24, 26, 28, which can be used to move or manipulate coupler 12. Additionally, some of the handles can be used to actuate other components of the coupler 12. For instance, as discussed in greater detail below, the handle 28 can pivot or otherwise move. Pivoting or movement of the handle 28 can facilitate the movement of the lever cams 18 into or out of engagement with the groove 16 in the adaptor 14. The pivoting or movement of the handle 28 can also move the seal assembly 20 and/or the poppet assembly 22. As also discussed below, movement of the seal assembly 20 can create or break a seal formed between the coupler 12 and the adaptor 14 and movement of the poppet assembly 22 (or portions thereof) can open or close a flow path for fluid or vapors through the coupler 12 and/or coupling 10.

Figure 3A:
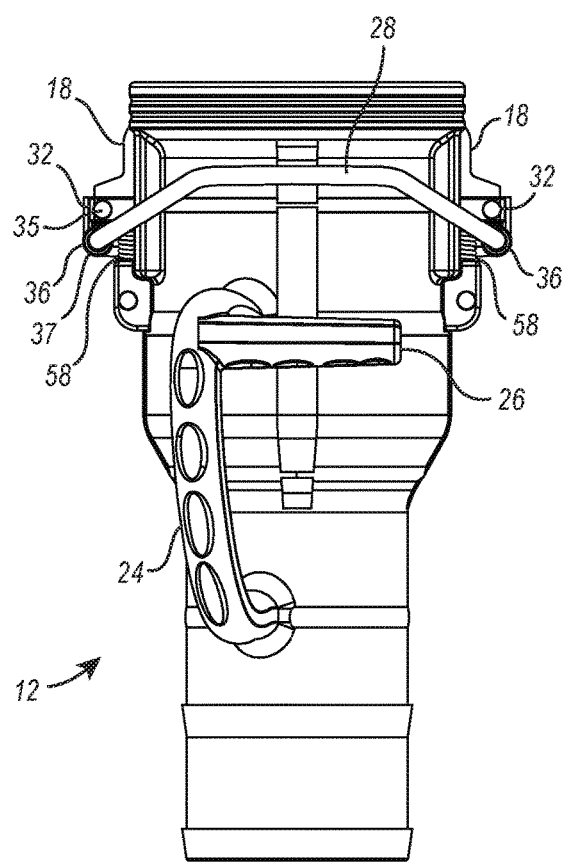
FIGS. 3A and 3B are top views of the coupler of FIG. 2.
Figure 3B:
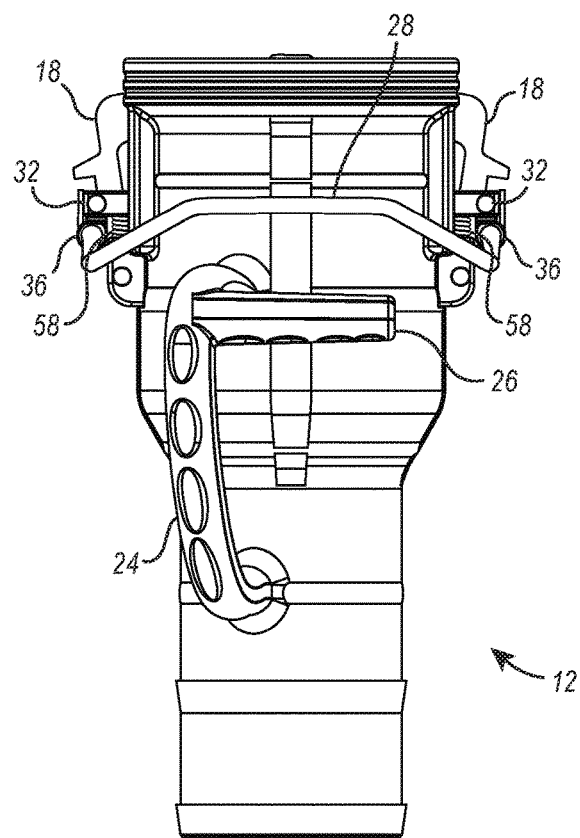

With continued attention to FIGS. 1 and 2, attention is also now directed to FIG. 3A-4B. FIGS. 3A-3B illustrate top views of coupler 12 and the FIGS. 4A-4B illustrate side views thereof. As can be seen in FIGS. 1, 2, 4A, 4B, handle 28 is pivotally or movably mounted in one or more channels, recesses, or holes 30 to enable handle 28 to move or pivot between a first position as shown in FIGS. 3A and 4A and a second position shown in FIGS. 3B and 4B. In the illustrated embodiment, when handle 28 is in the first position, handle 28 is positioned further away from handle 26 and closer to the open end of coupler 12 that receives adaptor 14 than when handle 28 is in the second position. In contrast, when handles 28 is in the second position, handle 28 is positioned closer to handle 26 and further away from the open end of coupler 12 than when handle 28 is in the first position.

Handle 28 is linked to seal assembly 20 such that movement of handle 28 between the first and second positions causes the seal assembly 20 to also move between first and second positions. More specifically, as can be seen in the Figures, seal assembly 20 includes wings 32 that extend through slots 34 in the body of coupler 12. Connected between wings 32 and handle 28 are sliders 36. In the illustrated embodiment, sliders 36 are mounted to wings 32 via a pin 35. In some embodiments, sliders 36 can rotate about pins 35. Sliders 36 also include an aperture 37 through which handle 28 extends. In some embodiments, sliders 36 can rotate about handle 28. Additionally, in some embodiments, handle 28 can slide through apertures 37 as handle 28 moves between the first and second positions.

The connection between handle 28 and wings 32 by sliders 36 links the movement of handle 28 and seal assembly 20. Thus, as can be seen when comparing FIG. 3A to FIG. 3B and FIG. 4A to FIG. 4B, movement of handle 28 between the first position and the second position results in the movement of seal assembly 20 between the first position and the second position (as can be seen by the different positions of wings 32).

In addition to linking together handle 28 and seal assembly 20, sliders 36 also interact with the lever cams 18. More specifically, sliders 36 are disposed against outer surfaces of lever cams 18. When handle 28 is moved to the first position shown in FIGS. 3A and 4A, sliders 36 press against lever cams 18 to move lever cams 18 to a closed or locked position. In the closed or locked position, at least a portion of lever cams 18 extend through slots 34 so as to be positionable within groove 16 of adaptor 14 to secure coupler 12 and adaptor 14 together. When handle 28 is moved to the second position shown in FIGS. 3B and 4B, sliders 36 allow lever cams 18 to move to an open or unlocked position. In the open or unlocked position, lever cams 18 are at least partially withdrawn from slots 34 so as to be removed from groove 16, thereby disconnecting coupler 12 from adaptor 14.

Figure 5A:
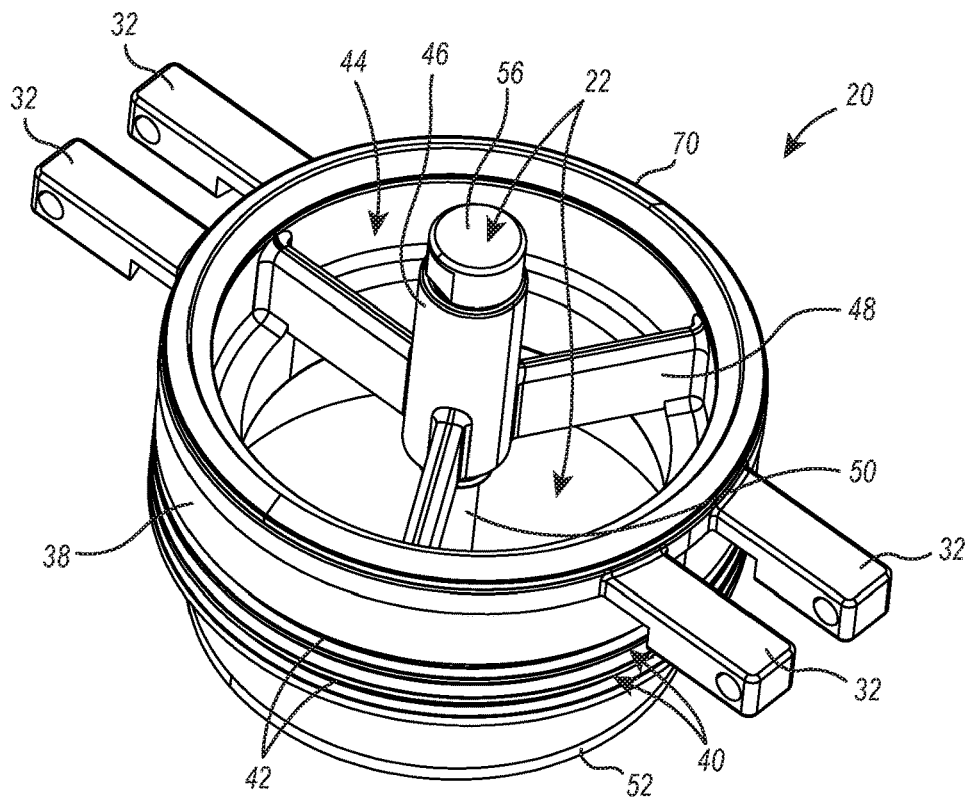
FIG. 5A-5D are perspective view of a seal assembly and poppet assembly of the coupler of FIG. 2-4B.
Figure 5B:
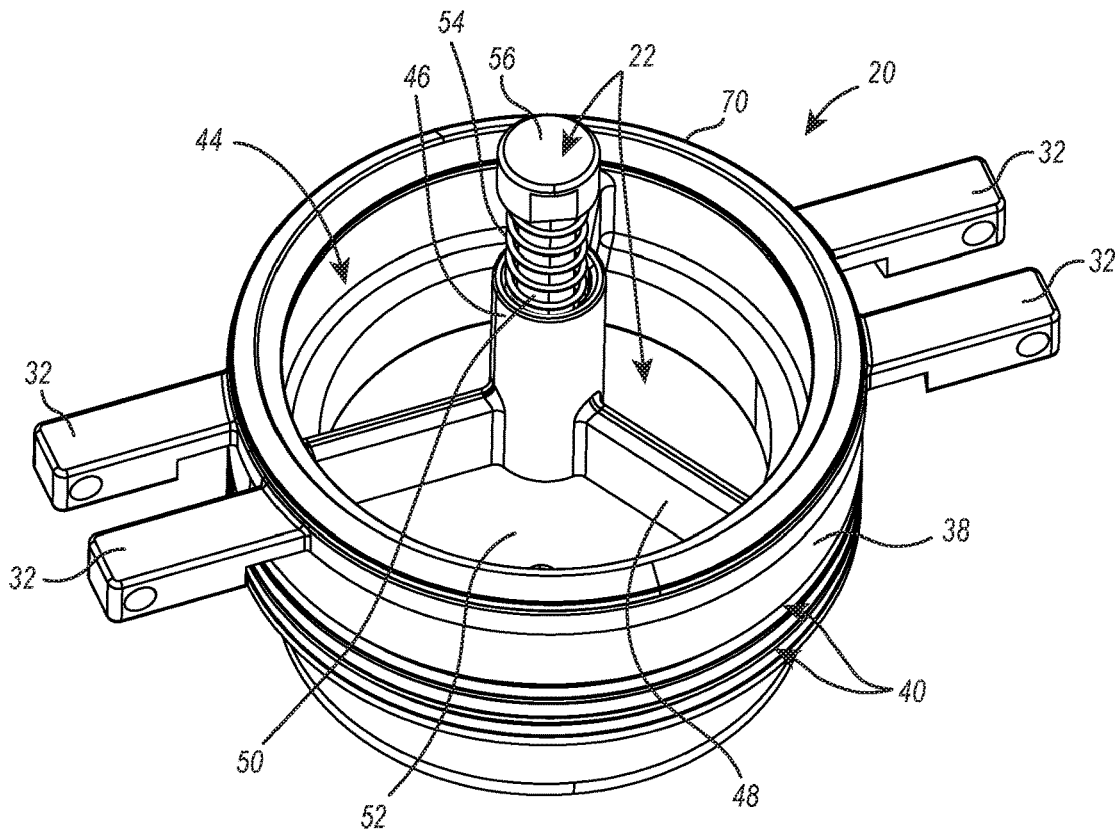
Figure 5C:
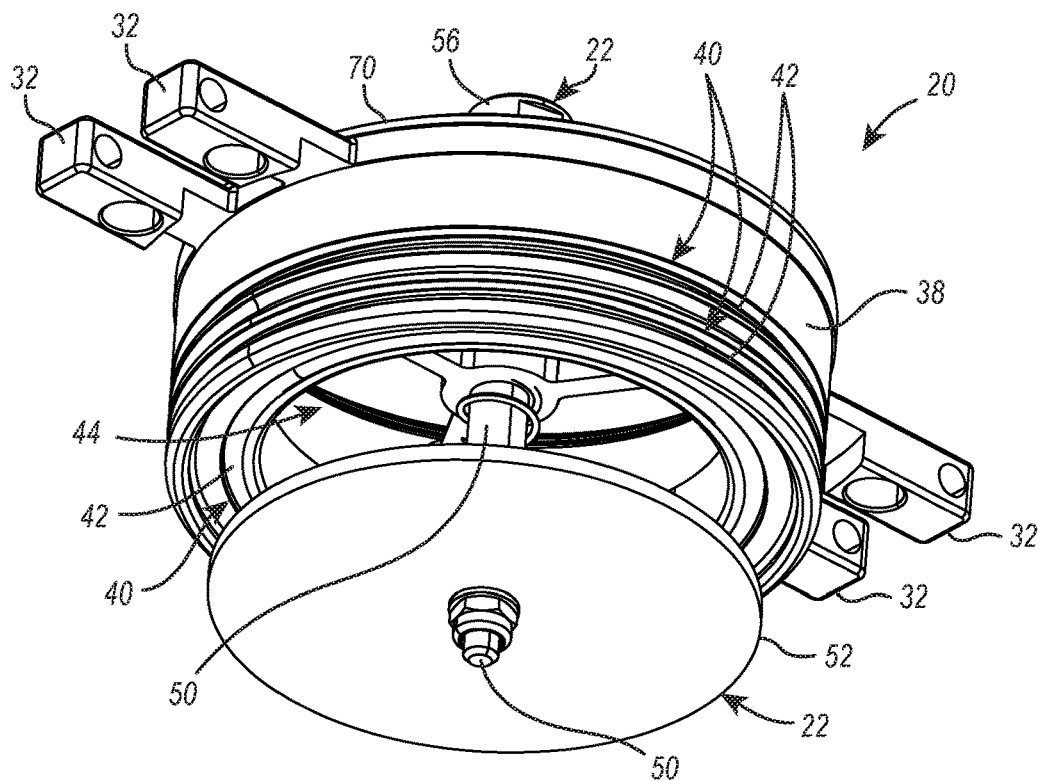
Figure 5D:
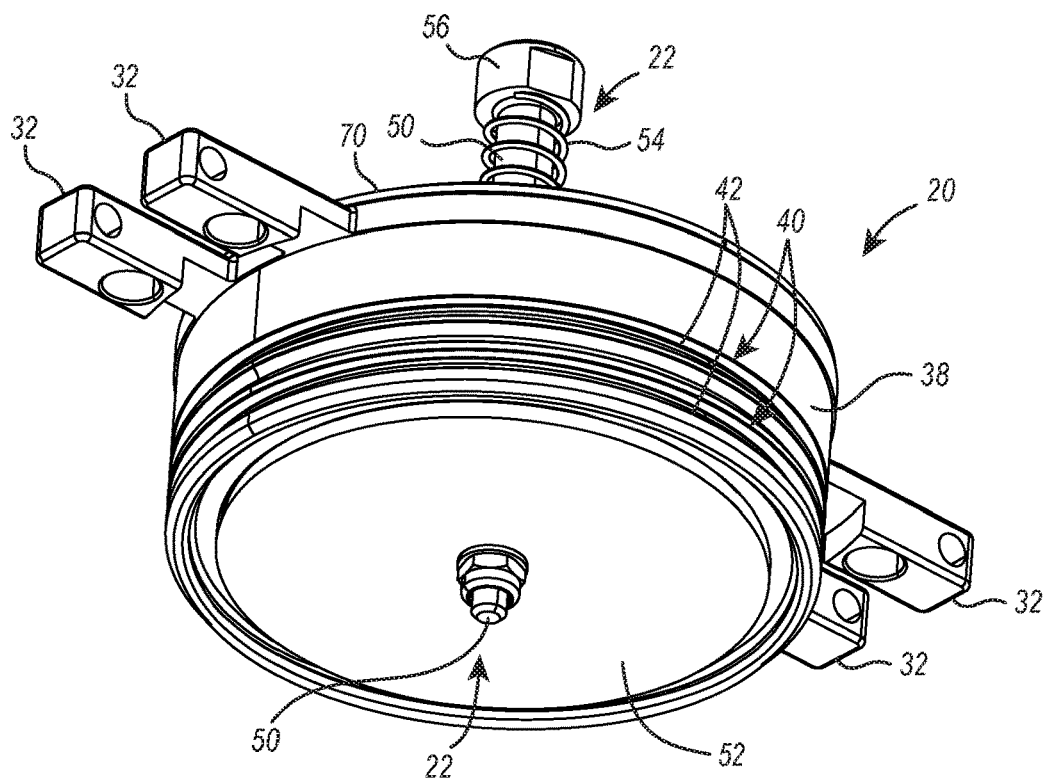

Attention is now directed to FIGS. 5A-5D, which illustrate seal assembly 20 and poppet assembly 22 apart from the rest of coupler 12. More specifically, FIGS. 5A-5D illustrate top and bottom perspective views with poppet assembly 22 in an open configuration (FIGS. 5A and 5C) and a closed configuration (FIGS. 5B and 5D). When poppet assembly 22 is in the open configuration, fluid and/or vapors can flow though coupler 12. In contrast, when poppet assembly 22 is in the closed configuration, fluid and/or vapors are prevented from flowing through or out of coupler 12.

According to the illustrated embodiment, seal assembly 20 includes a collar 38 having an outer surface that generally corresponds in size and shape to an inner surface of the bore or open end of coupler 12. Wings 32 extend outward from the outer surface of collar 38. The outer surface of collar 38 also includes annular grooves 40 in which seals 42 are disposed. Seals 42 can interact with the inner surface of the coupler body to limit or prevent fluid and/or vapors from passing between the coupler body and collar 38. Collar 38 also includes an annular groove 40 in a lower surface thereof with a seal 42 disposed therein, as shown in FIG. 5C. The seal 42 in the lower surface of collar 38 interacts with poppet assembly 22 to seal off the flow of fluid or vapors through coupler 12.

Collar 38 also has a central opening 44 therethrough through which fluid and/or vapors can pass when the poppet assembly 22 is in an open configuration. Mounted within the central opening 44 is a guide 46. The guide 46 is connected to collar 38 by supports 48. Guide 46 includes a central bore in which poppet assembly 22 is mounted.

Poppet assembly 22 includes a shaft 50 with a seal plate 52 mounted thereon. Shaft 50 is slidably disposed within guide 46 to enable poppet assembly 22 to move between the open and closed configurations. When poppet assembly 22 is in the closed configuration, seal plate 52 blocks or closes off the central opening 44. Seal plate 52 can interact with the seal 42 in the lower surface of collar 38 to prevent fluid or vapors from passing therebetween. In contrast, when poppet assembly 22 is in the open configuration, seal plate 52 is spaced apart from collar 38, thereby allowing fluid and vapors to flow around seal plate 52 and through central opening 44 in collar 38.

In some embodiments, poppet assembly 22 is biased to the closed configuration. For instance, the illustrated embodiment includes a biasing member 54 (e.g., coil spring) disposed around shaft 50 to urge poppet assembly 22 towards the closed configuration. More specifically, biasing member 54 is disposed between a head 56 of shaft 50 and a shoulder on or within guide 46. Biasing member 54 urges head 56 away from the shoulder on or within guide 46, which urges seal plate 52 towards the lower surface of collar 38. When coupler 12 is connected to adaptor 14, an element of adaptor 14 may interact with head 56 to overcome the biasing force of biasing member 54 and move poppet assembly 22 towards the open configuration.

Figure 6A:
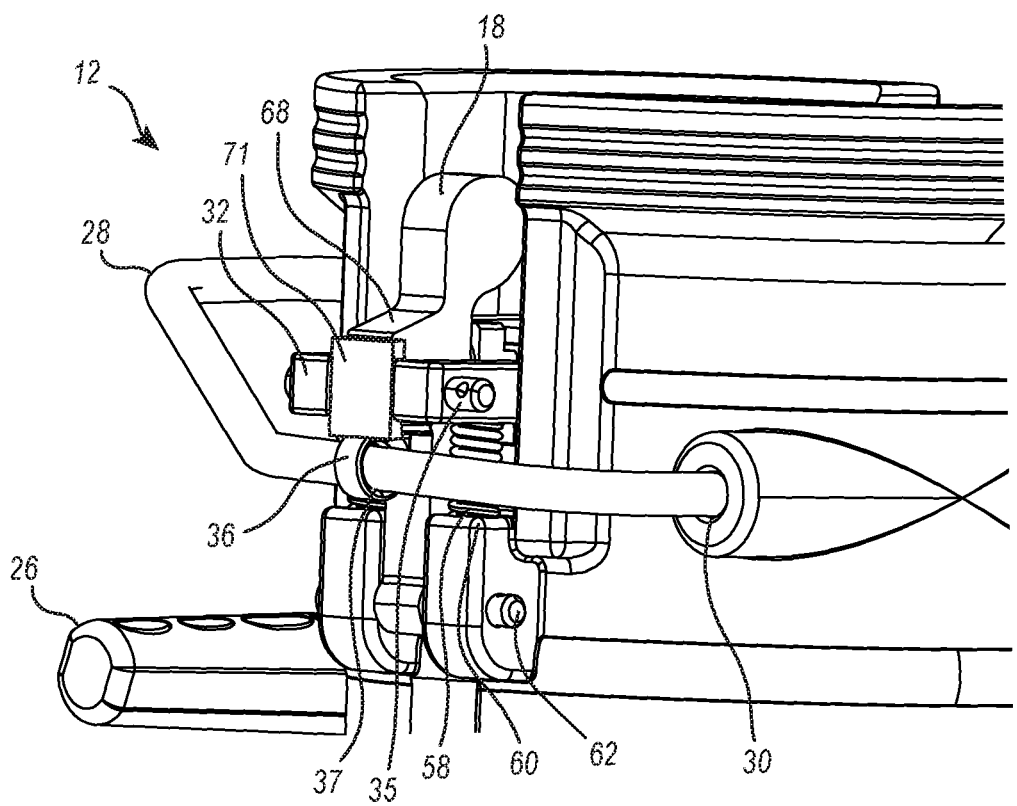
FIGS. 6A and 6B are perspective views of a portion of the coupler of FIGS. 2-4B.
Figure 6B:
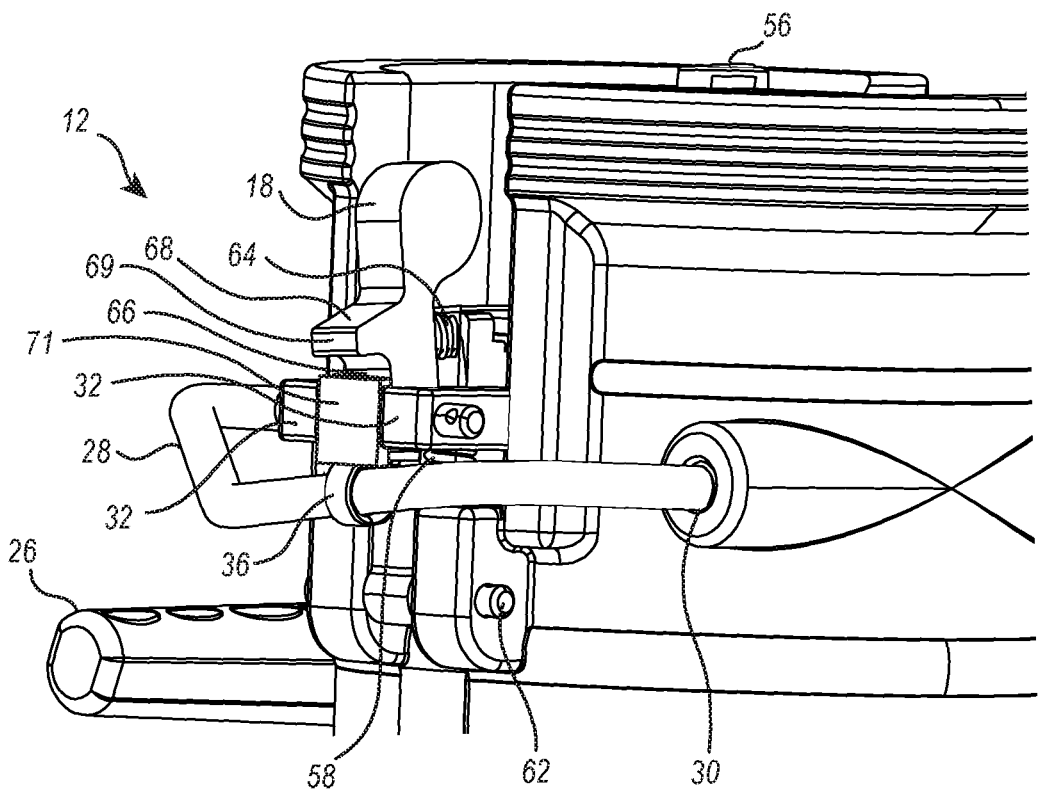

Attention is now directed to FIGS. 6A and 6B, which show close up views of the interaction between handle 28, lever cams 18, and seal assembly 20. In FIG. 6A, handle 28 is in the first position, seal assembly 20 is also in the first position (e.g., closer to the open end of coupler 12), and lever cams 18 are pushed to the closed or locked position. In contrast, in FIG. 6B, handle 28 is in the second position, seal assembly 20 is also in the second position (e.g., further from the open end of coupler 12), and lever cams 18 are pivoted or moved to the open or unlocked position.

In the illustrated embodiment, seal assembly 20 is biased towards the first position by biasing members 58 (e.g., coil springs). In particular, biasing members 58 are disposed between wings 32 and shoulders 60 formed on the coupler body. Biasing members 58 apply a biasing force to wings 32 (and thus seal assembly 20) in the direction of the first position. Due to the connection between seal assembly 20 and handle 28 via sliders 36, the biasing force from biasing members 58 is transferred to handle 28, thereby biasing and moving handle 28 to the first position.

When handle 28 is moved from the first position (FIG. 6A) to the second position (FIG. 6B), the force used to move handle 28 to the second position is transferred to seal assembly 20 by way of sliders 36. As a result, the biasing force of biasing members 58 can be overcome, thereby compressing biasing members 58 as shown in FIG. 6B. As biasing members 58 are compressed, seal assembly 20 moves to the second position. When the force is removed from handle 28, the biasing force of biasing members 58 urge seal assembly 20 and handle 28 back to the first position.

As can be seen in FIGS. 6A and 6B, lever cams 18 are pivotally mounted to the coupler body by way of pivot pins 62. As such, lever cams 18 can pivot between the closed or locked position shown in FIG. 6A and the open or unlocked position shown in FIG. 6B. As seen in FIG. 6B, a biasing member 64 (e.g., spring) is disposed between lever cam 18 and the coupler body to bias lever cam 18 towards the open or unlocked position. However, when seal assembly 20 and handle 28 move to the first position, slider 36 forces lever cam 18 to move to the closed or locked position. More specifically, when seal assembly 20 and handle 28 move to the first position, slider 36 engages a shoulder 66 (see FIGS. 6B-7B) on lever cam 18 in a manner that urges lever cam 18 towards the closed or locked position.

The biasing force of biasing members 58 may be larger than the biasing force of biasing members 64. As a result, the biasing force of biasing members 58 may urge seal assembly 20 towards the first position with sufficient force to overcome the biasing force of biasing members 64. Thus, absent an external force that overcomes the biasing force of biasing members 58 (e.g., a force applied to move handle 28 from the first position to the second position), lever cams 18 are biased towards the closed or locked position.

In some embodiments, coupler 12 may include one or more stops to limit the range of movement of various components thereof. For instance, one or more stops may be provided on the coupler body or on the lever cams 18 to limit the movement of seal assembly 20 and/or handle 28. In the illustrated embodiment, for example, each of lever cams 18 includes a stop 68 that limits the movement of seal assembly 20 and handle 28 towards the open end of coupler 12. As illustrated in FIG. 6A, when seal assembly 20 and handle 28 move towards the first position, slider 36 engages stop 68, which prevents further movement of slider 36 and the attached seal assembly 20 and handle 28. Similarly, channels, recesses, or holes 30 may also include one or more stops to limit the pivoting or other movement of handle 28.

In some embodiments, the stops 68 of the lever cams 18 can also provide a visional indication as to whether the lever cams 18 are in the closed or locked position or in the open or unlocked position. For instance, a surface 69 on one or both of the lever cams 18 can include a visual indicator (e.g., color, letters, words, symbol). The slider 36 may include a tab 71 that may selectively cover or reveal the surface 69. For instance, as shown in FIG. 6A, the tab 71 covers the surface 69 when the lever cams 18 are in the closed or locked position. In contrast, as shown in FIG. 6B, the tab 71 is withdrawn from over the surface 69 when the lever cams 18 are in the open or unlocked position such that an operator can see surface 71. Being able to see the visual indicator on surface 69 (e.g., when tab 71 is withdrawn from over surface 69) can indicate to an operator that the lever cams 18 are in the open or unlocked position. In contrast, not being able to see the visual indicator on surface 69 (e.g., when tab 71 is withdrawn from over surface 69) can indicate to an operator that the lever cams 18 are in the closed or locked position.

Figure 7A:
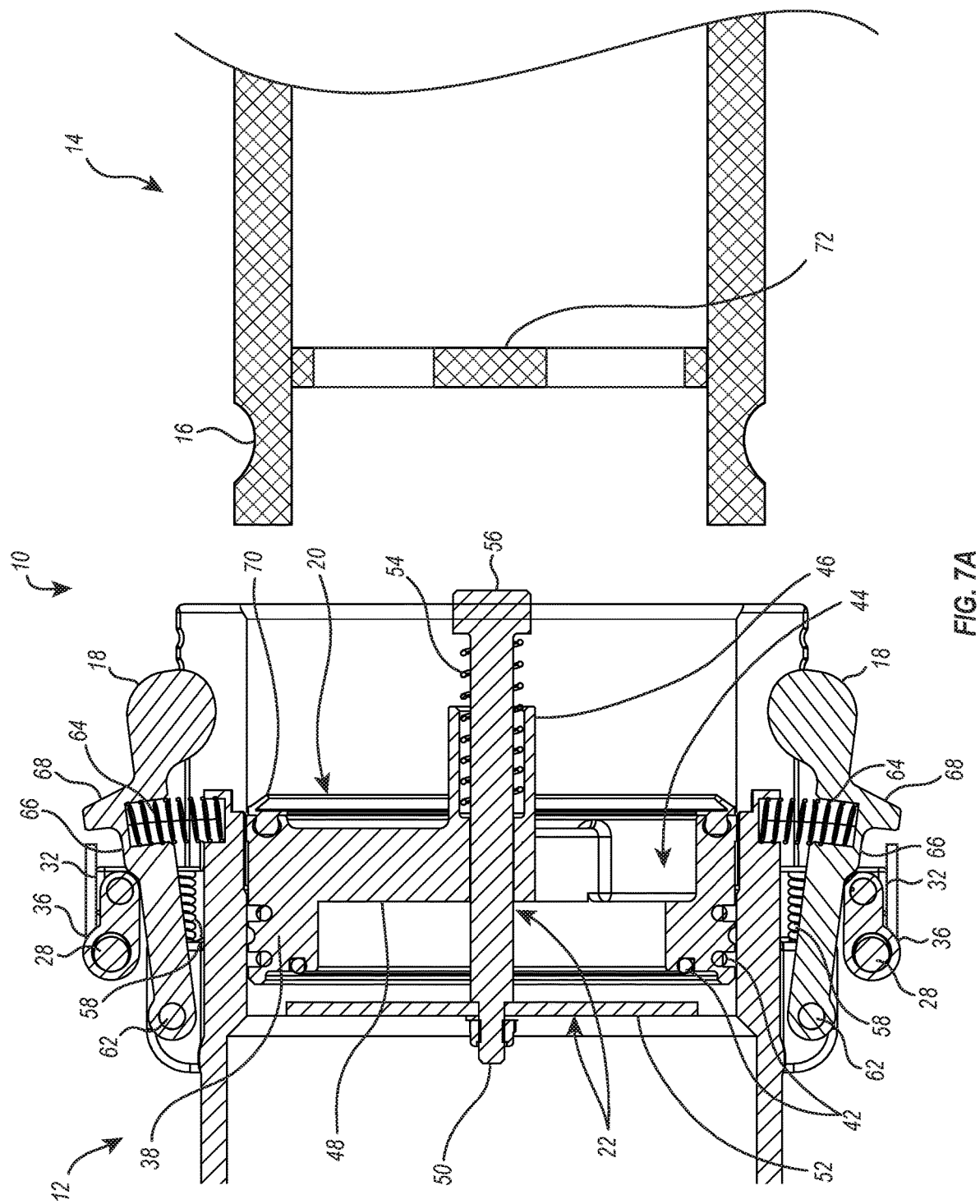

Attention is now directed to FIGS. 7A and 7B, which illustrate cross-section views of coupling 10 in an uncoupled configuration and a coupled configuration, respectively. In FIG. 7A, handle 28 has been moved to the second position. As a result, biasing members 58 have been compressed and sliders 36 and sealing assembly 20 have been moved away from the open end of coupler 12 in connection with the movement of handle 28. As can be seen, sliders 36 are disengaged from shoulders 66 on lever cams 18 when handle 28 is moved to the second position. Because sliders 36 are disengaged from shoulders 66, biasing members 64 can urge lever cams 18 outward as shown. With lever cams 18 pivoted outward as shown, coupler 12 is in a configuration to receive the end of adaptor 14 therein.

Also of note in FIG. 7A is that poppet assembly 22 is in a closed configuration. In particular, biasing member 54 is urging shaft 50 and connected seal plate 52 to the closed configuration in which seal plate 52 is positioned against collar 38 to close or seal off the central opening 44 through collar 38.

In FIG. 7B, the end of adaptor 14 has been inserted into the open end of coupler 12 and handle 28 has been released so that it has moved to the first position. As noted above, when no external force is applied to handle 28, biasing members 58 urge seal assembly 20 and handle 28 to the first position. When adaptor 14 is inserted into coupler 12 and seal assembly 20 is moved to the first position (e.g., towards the open end of coupler 12), an adaptor seal 70 mounted on collar 38 engages the terminal end of adaptor 14 to create a fluid and vapor tight seal between coupler 12 and adaptor 14.

In addition to moving sealing assembly 20 into engagement with adaptor 14, the biasing force from biasing members 58 also urges sliders 36 into engagement with shoulders 66 on lever cams 18. As shown in FIG. 7B, such engagement forces lever cams 18 to pivot inward towards adaptor 14. The biasing force from biasing members 58 can be sufficiently large to overcome the biasing force of biasing members 64, thereby causing lever cams 18 to pivot inward. When lever cams 18 are pivoted inward, a portion of lever cams 18 extends into groove 16, which locks adaptor 14 to coupler 12 and prevents adaptor 14 from being removed until handle 28 is moved to the second position.

In the illustrated embodiment, adaptor 14 includes an engagement feature 72 that can engage poppet assembly 22. In the illustrated embodiment, engagement feature 72 is positioned within adaptor 14 such that insertion of adaptor 14 into coupler 12 causes engagement feature 72 to engage head 56 of poppet assembly 22. As adaptor 14 is advanced into coupler 12 and seal assembly 20 moves towards the open end of coupler 12 (e.g., towards the first position), engagement feature 72 applies a force on head 56 sufficient to overcome the biasing force of biasing member 54. As a result, shaft 50 moves through guide 46 in a direction away from the open end of coupler 12. Such movement causes seal plate 52 to disengage collar 38 to allow for fluid or vapor to pass therebetween and through collar 38 and coupling 10.

To disconnect adaptor 14 from coupler 12, handle 28 is moved from the first position to the second position. Such movement causes sliders 36 to disengage shoulders 66, thereby allowing lever cams 18 to pivot outward under the influence of biasing members 64. The outward movement of lever cams 18 withdraws lever cams 18 from groove 16, thereby allowing adaptor 14 to be withdrawn from coupler 12.

The movement of handle 28 to the second position also causes seal assembly 20 to move to the second position. Such movement causes collar 38 to move towards seal plate 52 and away from adaptor 14. Such movement breaks the seal formed between coupled 12 and adaptor 14 by adaptor seal 70 and also creates a seal between collar 38 and the seal plate 52. Additionally, as adaptor 14 is withdrawn from coupled 12, the biasing force of biasing member 54 urges seal plate 52 towards collar 38 and the seal 40 thereof.

Figure 8:
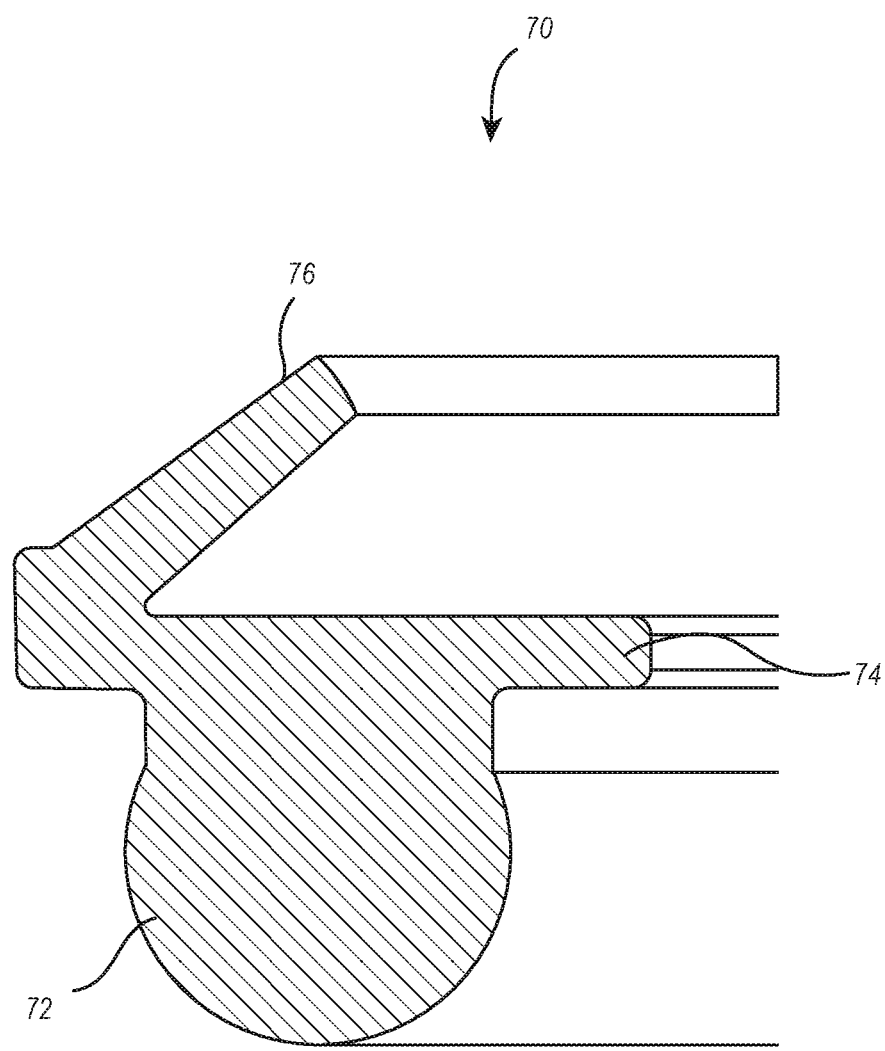
FIG. 8 is a partial cross-section view of an adaptor seal of the sealing assembly of FIGS. 5A-5D.

Finally, attention is directed to FIG. 8, which illustrates a partial cross-sectional view of adaptor seal 70. Adaptor seal 70 is generally in the form of a circular ring. As can be seen, adaptor seal 70 includes a first portion 72 that has a substantially circular cross-section shape. First portion 72 can be received within an annular groove in collar 38.

Adaptor seal 70 also includes a second portion 74 that has a substantially rectangular cross-sectional shape that is oriented substantially tangential to first portion 72. As can be seen in FIGS. 7A and 7B, second portion 74 is oriented so that a major surface thereof is generally parallel to an end surface of adaptor 14 that will engage adaptor seal 70. According to the illustrated embodiment, the length of second portion 74 (in the radial direction) is larger than the diameter of first portion.

Adaptor seal 70 also includes a third portion 76 extending from second portion 74. In the illustrated embodiment, third portion 76 has a generally rectangular cross-sectional shape. Third portion 76 extends from an end of section portion 74 at an angle and generally towards the center of adaptor seal 70 (e.g., radially inward) and towards adaptor 14 (e.g., away from first portion 72). In the illustrated embodiment, second and third portions 74, 76 form an acute angle and the length of third portion 76 is shorter than the length of second portion 74. In other embodiments, third portion 76 may be longer or the same length as second portion 74. Also, in some embodiments, third portion 76 may extend from an opposite end of second portion and may extend generally away from the center of adaptor seal 70 (e.g., radially outward) and towards adaptor 14 (e.g., away from first portion 72).

When adaptor 14 is connected to coupler 12, the end of adaptor 14 engages adaptor seal 70. In some embodiments, the end of adaptor 14 engages third portion 76 and compresses third portion 76 between second portion 74 and the end of adaptor 14. In other embodiments, third portion 76 extends around the outer (or inner) surface of adaptor 14 and the end of adaptor 14 engages second portion 74. In any event, adaptor seal 70 can create a fluid and/or vapor tight seal between coupler 12 and adaptor 14.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid system coupler, comprising:
a coupler body at least partially defining a fluid passageway therethrough, the coupler body having an open end configured to selectively receive an adaptor therein,
a seal assembly movably disposed within the coupler body;
one or more lever cams pivotally connected to the coupler body; and
a handle movably connected to the coupler body, the handle being connected to the seal assembly by one or more sliders such that movement of the handle moves the one or more sliders and the seal assembly relative to the coupler body, the one or more sliders being configured to engage the one or more lever cams during movement of the handle such that movement of the handle moves the one or more sliders and causes the one or more lever cams to pivot relative to the coupler body.

2. A fluid system coupler as recited in claim 1, wherein coupler body has one or more slots extending therethrough adjacent to the open end.

3. A fluid system coupler as recited in claim 2, wherein a portion of the one or more lever cams extends through the one or more slots in the coupler body to engage the adaptor when the one or more lever cams are in a locked position, and wherein the one or more lever cams are at least partially withdrawn from the one or more slots to disengage the adaptor when the one or more lever cams are in an unlocked position.

4. A fluid system coupler as recited in claim 2, the seal assembly has one or more wings that extend through the one or more slots in the coupler body.

5. A fluid system coupler as recited in claim 4, wherein the handle is linked to the one or more wings outside the coupler body.

6. A fluid system coupler as recited in claim 1, further comprising a poppet assembly movably mounted to the seal assembly, wherein the poppet assembly comprises a seal plate that is movable between an open configuration and a closed configuration.

7. A fluid system coupler, comprising:
a coupler body at least partially defining a fluid passageway therethrough, the coupler body having an open end configured to selectively receive an adaptor therein and one or more slots extending through the coupler body adjacent to the open end;
a seal assembly disposed within the coupler body and movable between a first position and a second position, the seal assembly having one or more central openings to allow fluid or vapor to flow through the seal assembly, the seal assembly having one or more wings that extend through the one or more slots to an exterior in the coupler body;
one or more lever cams that are pivotally connected to the coupler body, the one or more lever cams being movable between a locked position and an unlocked position, a portion of the one or more lever cams extending through the one or more slots in the coupler body to engage the adaptor when the one or more lever cams are in the locked position, and the one or more lever cams being at least partially withdrawn from the one or more slots to disengage the adaptor when the one or more lever cams are in the unlocked position; and
a handle movable connected to the coupler body and to the wings of the seal assembly, the handle being movable between a first position and a second position, movement of the handle from the first position to the second position moves the seal assembly from the first position to the second position and enables the one or more lever cams to move to the unlocked position, and movement of the handle from the second position to the first position moves the seal assembly from the second position to the first position and moves the one or more lever cams to the locked position.

8. A fluid system coupler as recited in claim 7, wherein the handle and the seal assembly are linked together by one or more sliders.

9. A fluid system coupler as recited in claim 8, wherein the one or more sliders engage the one or more lever cams to move the one or more lever cams to the locked position when the handle is moved to the first position.

10. A fluid system coupler as recited in claim 9, wherein the one or more sliders engage the one or more shoulders on the one or more lever cams to move the one or more lever cams to the locked position.

11. A fluid system coupler as recited in claim 7, wherein the seal assembly is biased towards the first position by one or more biasing members.

12. A fluid system coupler as recited in claim 11, wherein the handle and the seal assembly are linked together such that the one or more biasing members also bias the handle to the first position.

13. A fluid system coupler as recited in claim 7, wherein the one or more lever cams are biased towards the unlocked position by one or more biasing members.

14. A fluid system coupler, comprising:
a coupler body at least partially defining a fluid passageway therethrough, the coupler body having an open end configured to selectively receive an adaptor therein;
a seal assembly movably disposed within the coupler body, the seal assembly comprising a collar, an adaptor seal mounted on a first end of the collar, and a seal mounted on a second end of the collar, the adaptor seal being configured to sealingly engage an end of an adaptor received within the coupler body;
a poppet assembly movably mounted to the seal assembly, the poppet assembly comprising a seal plate that is movable between an open configuration and a closed configuration, the seal plate sealingly engaging the seal mounted on the second end of the collar in the closed configuration; and
a handle movably connected to the coupler body, the handle being operatively associated with the seal assembly such that movement of the handle moves the seal assembly relative to the coupler body.

15. A fluid system coupler as recited in claim 14, wherein the seal assembly comprises a guide.

16. A fluid system coupler as recited in claim 15, wherein the poppet assembly comprises a shaft slidably disposed at least partially within the guide, and wherein the seal plate is connected to the shaft.

17. A fluid system coupler as recited in claim 16, wherein the poppet assembly is movable between an open configuration and a closed configuration, wherein the seal plate closes off one or more central openings in the seal assembly when the poppet assembly is in the closed configuration, and wherein the seal plate is spaced apart from the seal assembly to enable fluid or vapor to flow through the one or more central openings when the poppet assembly is in the open configuration.

18. A fluid system coupler as recited in claim 17, wherein the poppet assembly is biased towards the closed configuration by a biasing member.

19. A fluid system coupler as recited in claim 18, wherein the biasing member is disposed between a head on the shaft and a shoulder on the guide.

20. A fluid system coupler as recited in claim 17, further comprising one or more lever cams that are pivotally connected to the coupler body, the one or more lever cams being movable between a locked position and an unlocked position.

21. A fluid system coupler as recited in claim 14, wherein the adaptor seal comprises a first portion having a generally circular cross-sectional shape, a second portion having a generally rectangular cross-sectional shape, and a third portion having a generally rectangular cross-sectional shape.

22. A fluid system coupler as recited in claim 21, wherein the second portion extends generally tangentially relative to the first portion such that the second portion is oriented generally parallel to an end face of the adaptor.

23. A fluid system coupler as recited in claim 21, wherein the third portion extends from the second portion at an acute angle.

* * * * *